United States Patent [19]
Sugita et al.

[11] Patent Number: 5,608,764
[45] Date of Patent: Mar. 4, 1997

[54] OFDM SYNCHRONIZATION DEMODULATION CIRCUIT

[75] Inventors: Yasushi Sugita; Tatsuya Ishikawa; Takashi Seki, all of Kanagawa-ken, Japan

[73] Assignee: Kabushiki Kaisha Toshiba, Kawasaki, Japan

[21] Appl. No.: 339,697

[22] Filed: Nov. 14, 1994

[30] Foreign Application Priority Data

Nov. 12, 1993 [JP] Japan ................................ 5-283582

[51] Int. Cl.$^6$ .............................. H04L 27/32; H04L 7/02
[52] U.S. Cl. ......................... 375/344; 375/260; 375/355
[58] Field of Search .................................... 375/344, 355, 375/260; 370/70

[56] References Cited

U.S. PATENT DOCUMENTS

| | | | |
|---|---|---|---|
| 5,206,886 | 4/1993 | Bingham | 375/344 |
| 5,228,062 | 7/1993 | Bingham | 375/344 |
| 5,259,000 | 11/1993 | Kojima et al. | 375/377 |
| 5,282,222 | 1/1994 | Fattouche et al. | 375/200 |
| 5,283,780 | 2/1994 | Schuchman et al. | 375/344 |
| 5,311,550 | 5/1994 | Fouche et al. | 375/260 |
| 5,313,169 | 5/1994 | Fouche et al. | 329/302 |
| 5,345,440 | 9/1994 | Gledhill | 370/19 |
| 5,371,761 | 12/1994 | Daffara et al. | 375/200 |
| 5,440,587 | 8/1995 | Ishikawa et al. | 375/344 |
| 5,519,733 | 5/1996 | Huang | 375/344 |

FOREIGN PATENT DOCUMENTS

| | | |
|---|---|---|
| 0453203 | 10/1991 | European Pat. Off. . |
| 5504037 | 6/1993 | Japan . |
| 6-244892 | 9/1994 | Japan . |
| WO92/05646 | 4/1992 | WIPO . |
| WO92/10043 | 6/1992 | WIPO . |

OTHER PUBLICATIONS

F. Daffara et al. *Maximum Likelihood Frequency Detectors for Orthogonal Multicarrier Systems,* IEEE International Conference on Communications '93, Technical Program, Conference Record, vol. 2/3, May 23, 1993, pp. 766–771.

Le Floch et al., "Digital Sound Broadcasting to Mobile Receivers", IEEE, 1989, pp. 493–503.

Gledhill et al., "The Transmission of Digital Television in the UHF Band Using Orthogonal Frequency Division Multiplexing", National Transcommunications Ltd. UK, pp. 175–180.

*Primary Examiner*—Stephen Chin
*Assistant Examiner*—Jeffrey W. Gluck
*Attorney, Agent, or Firm*—Cushman Darby & Cushman IP Group of Pillsbury Madison & Sutro, LLP

[57] ABSTRACT

An OFDM synchronization demodulation circuit includes a receiving circuit for receiving an orthogonal frequency division multiplexing (OFDM) modulation signal. An orthogonal detection circuit orthogonally detects the OFDM modulation signal from the receiving circuit using a detected carrier. A demodulation circuit orthogonally demodulates the detected OFDM multiplex modulation signal from the orthogonal detection circuit by sampling the OFDM multiplex detection signal using a detected clock. A constellation analyzing circuit analyzes the constellation of demodulated symbols of predetermined carriers in the demodulated OFDM multiplex signal signal. A carrier frequency deviation detection circuit detects a frequency deviation of the detected carrier based on a rotation of the constellation of the demodulated symbol detected by the constellation analyzing circuit. A carrier detection circuit responsive to the frequency deviation detected by the carrier frequency deviation detection circuit controls the detected carrier. A clock frequency deviation detection circuit detects a frequency deviation of the detected clock based on rotations of the constellations of at least two demodulated symbols detected by the constellation analyzing circuit. A clock detection circuit controls the detected clock based on the frequency deviation detected by the clock frequency deviation detection circuit.

4 Claims, 6 Drawing Sheets

OFDM SYNCHRONIZATION DEMODULATION CIRCUIT

FIELD OF THE INVENTION

The present invention relates to an OFDM synchronization demodulation circuit, and more particularly, to an OFDM synchronization demodulation circuit for obtaining a carrier synchronization and a clock synchronization from information signals.

BACKGROUND OF THE INVENTION

In recent years, digital modulation techniques of high quality and high frequency utilizing efficiency have been developed for a transmission of video or audio signals. Particularly in the mobile radio communication, an adoption of orthogonal frequency division multiplexing (hereinafter referred to as OFDM) modulation technique which is durable against a multiple path interference is now under consideration. OFDM is a system that disperses transmission digital data into multiple carriers (approximately 256 through 1024 carriers) (hereinafter simply referred to as multiple carriers) which are mutually orthogonal and that modulates each of them.

Figure 1:
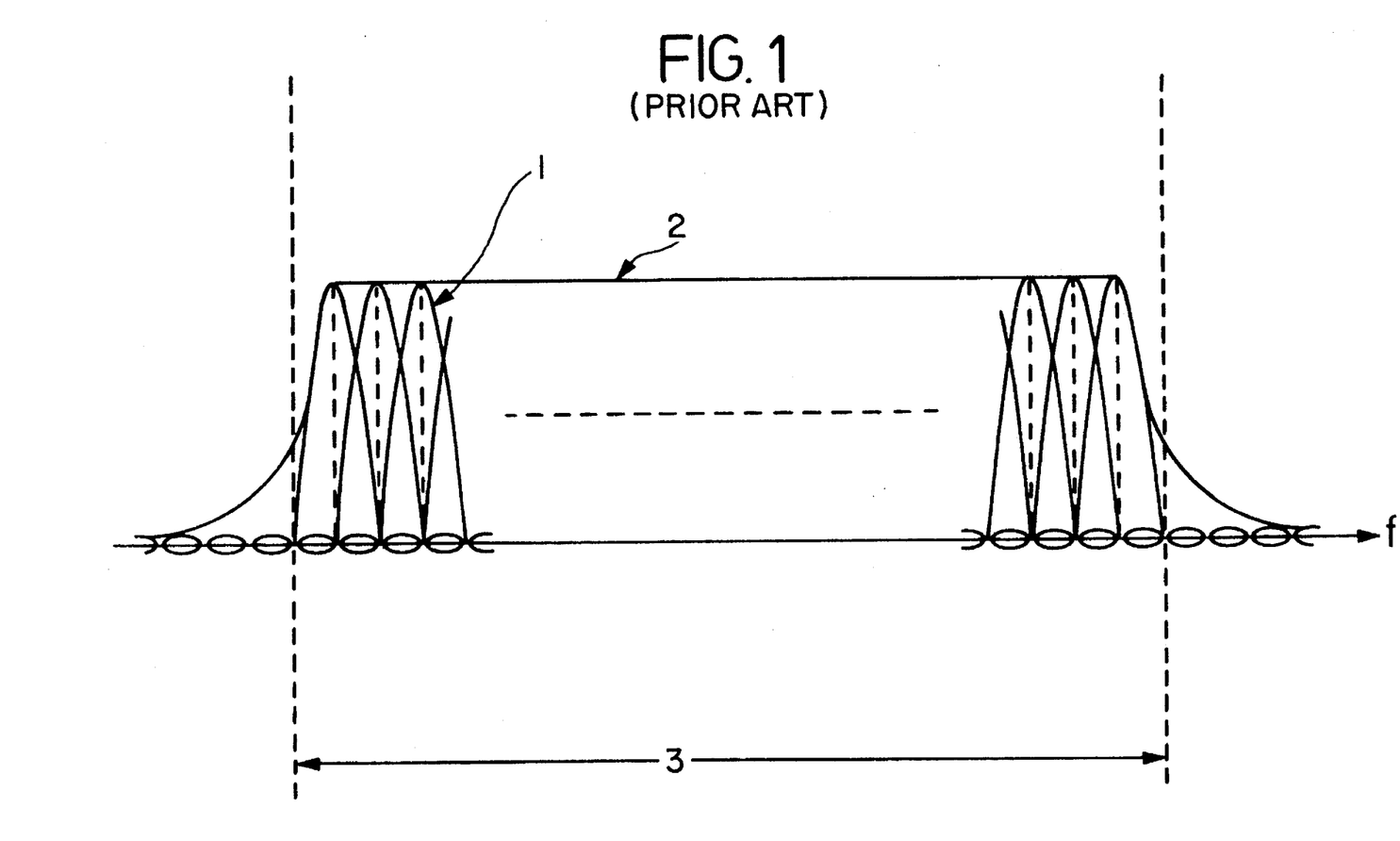
FIG. 1 is a waveform diagram showing a typical frequency spectrum of the OFDM modulated wave.

FIG. 1 is a waveform diagram showing a typical frequency spectrum of the OFDM modulated wave.

As shown in FIG. 1, an OFDM modulated wave is comprised of multiple carriers, each of the carriers having been, for instance, processed using QAM (quadrature amplitude modulation). In FIG. 1, item 1 represents a sub-carrier power spectrum, item 2 represents an OFDM power spectrum, and item 3 represents channel bandwidth. The vertical axis represents power. Frequency power spectrum of the OFDM modulated wave in a channel is expressed by superposing a frequency spectrum of multiple QAM modulated carriers. Further, because all the frequency spectra of the carriers have the same characteristics and because the carriers are provided at a relatively small and/or the same frequency interval, the waveform of the OFDM modulated wave resembles white noise.

Figure 2:
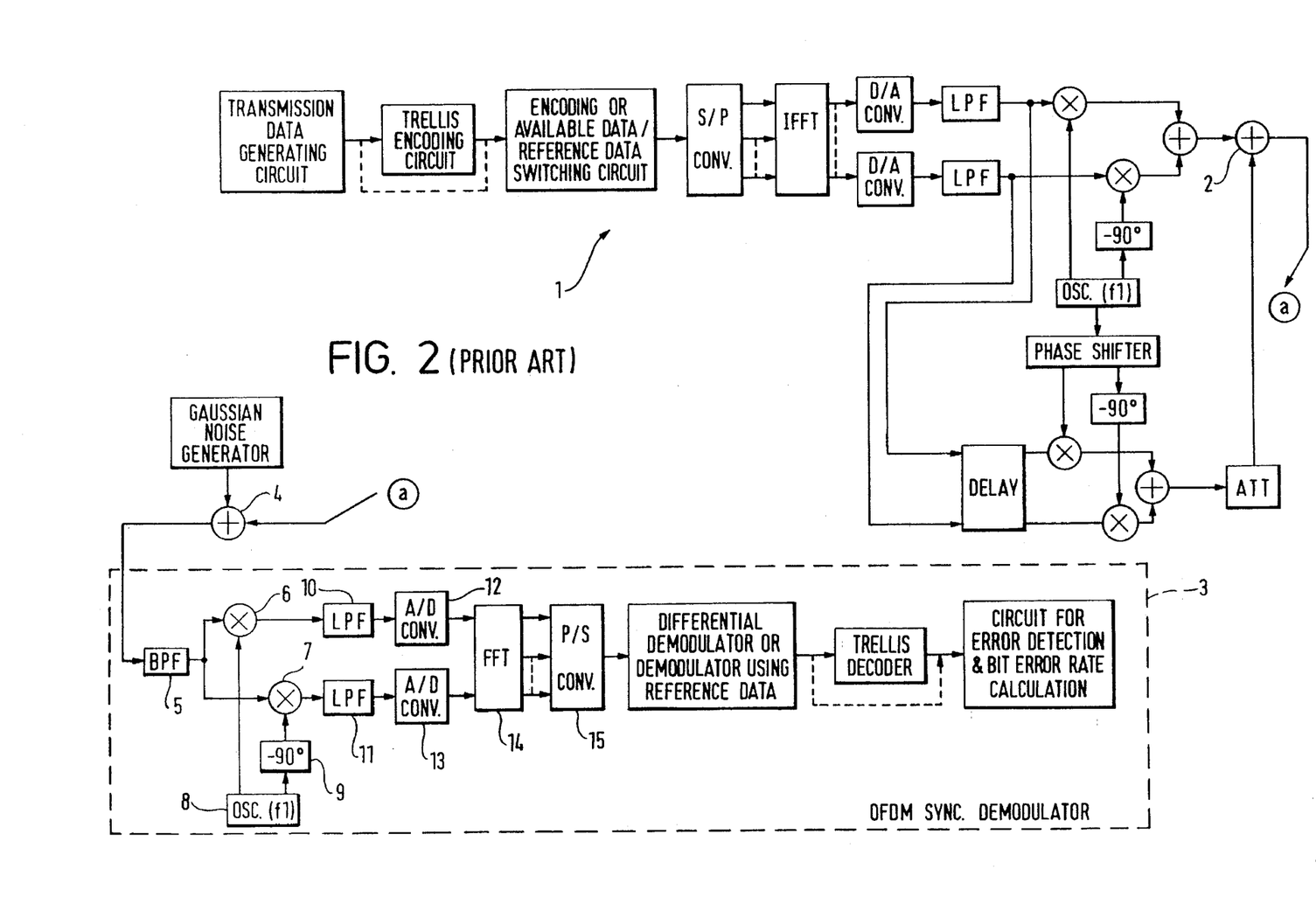
FIG. 2 is a block diagram showing a conventional OFDM modulation/demodulation system.

The OFDM modulated wave is transmitted after it is orthogonally modulated. The OFDM modulated wave is obtained at a receiver section through synchronous demodulation carriers for sync demodulation are detected by controlling the oscillation output of an oscillator using a transmitted wave. However, since the transmitted OFDM modulated wave is a waveform resembling white noise, it is not possible to eliminate frequency detuning using the transmitted OFDM modulated wave. So, in a conventional OFDM sync demodulation circuit, a frequency deviation is reduced by improving the accuracy of an oscillator. FIG. 2 is a block diagram showing a conventional OFDM modulation/demodulation system including an OFDM sync demodulation circuit, which is discussed in "1992, Collection of Release Scheduled Open Research Theses of NHK Technical Research Institute", pp. 28–36.

In FIG. 2, an OFDM modulation circuit 1 orthogonally modulates the OFDM modulated transmitted data using a carrier of frequency f1, and outputs the data from an adder 2 after OFDM modulating transmission data by an inverse fast Fourier transform circuit (hereinafter referred to as IFFT circuit). The OFDM modulated wave is input to an OFDM sync demodulator 3 via an adder 4. The OFDM modulated wave is supplied to a BPF 5, and after removing noise, it is supplied to multipliers 6 and 7. The multiplier 6 applies an in-phase axis according to a carrier having frequency f1 from an oscillator 8; multiplier 6 performs an in-phase detection through multiplication with the OFDM modulated wave. Further, the phase of the carrier output from the oscillator 8 is shifted by −90° using phase shifter 9 before being input to the multiplier 7 which performs orthogonal detection through multiplication with the OFDM modulated wave.

The detection outputs from the multipliers 6 and 7 are respectively applied to A/D converters 12 and 13 via low-pass filters (LPF) 10, 11, respectively and are converted to digital signals. The outputs of the A/D converters 12 and 13 are applied to a fast Fourier transform (hereinafter referred to as FFT) circuit 14, where carriers are demodulated. The demodulated signal output from the FFT circuit is converted into serial data and output by a parallel/serial converter (hereinafter referred to as P/S converter) 15.

In a system, as shown in FIG. 2, frequency deviations are reduced by improving oscillation accuracy of oscillator 8 as described above. However, it is extremely difficult to maintain high oscillation accuracy. Furthermore, a high accuracy oscillator is expensive and hard to incorporate into commercial models of receivers.

Further, because the OFDM modulated wave resembles white noise, it is also difficult to maintain a highly accurate detected clock frequency using an OFDM modulated wave. Therefore, conventional system using OFDM processing inserts a reference signal to obtain clock synchronization. For instance, a reference signal such as a non-signal period (null symbol period) or a slot, etc., is added to data for every several tens of symbol periods. As such, conventional systems achieve a clock synchronization by detecting a reference signal contained in transmitted data. That is, by detecting a demarcation timing of a reference signal from the envelope of the modulated wave, the clock synchronization is obtained on the basis of the detected timing.

However, a sufficient accuracy cannot be obtained by the method of obtaining the clock synchronization based on a reference signal which is periodically transmitted. Further, the reference signal may be disturbed and/or detected erroneously so that the normal demodulation can not be executed for an extended period of time, e.g., until a next reference signal is detected.

In conventional OFDM sync demodulation circuits as described above, a highly accurate oscillator was needed to obtain carrier synchronization. Thus, in the conventional circuits, it is difficult to adopt such a highly accurate oscillator for commercial models of receivers. Further, conventional systems experienced problems when implementing the above-described method of detecting clocks by inserting a reference signal in transmission signal. Specifically, the carrier synchronization is low in accuracy and weak against disturbance.

SUMMARY OF THE INVENTION

It is, therefore, an object of the present invention to provide an OFDM synchronization demodulation circuit which is capable of obtaining carrier synchronizations and clock synchronizations using OFDM modulated waves.

In order to achieve the above object, an OFDM synchronization demodulation circuit according to one aspect of the present invention includes a receiving circuit for receiving an orthogonal frequency division multiplexing (OFDM) modulation signal, an orthogonal detection circuit for orthogonally detecting the OFDM modulation signal from the receiving circuit by using a detected carrier, a demodulation circuit for orthogonally demodulating the detected OFDM multiplex modulation signal from the orthogonal detection circuit through a sampling of the OFDM multiplex detection signal by using a detected clock, a constellation analyzing circuit for analyzing the constellation of demodulated symbols of predetermined carriers in the demodulated OFDM multiplex signal signal, a carrier frequency deviation detection circuit for detecting a frequency deviation of the detected carrier based on a rotation of the constellation of the demodulated symbol detected by the constellation analyzing circuit, a carrier detection circuit responsive to the frequency deviation detected by the carrier frequency deviation detection circuit for controlling the detected carrier, a clock frequency deviation detection circuit for detecting a frequency deviation of the detected clock based on rotations of the constellations of at least two demodulated symbols detected by the constellation analyzing circui, and a clock detection circuit responsive to the frequency deviation detected by the clock frequency deviation detection circuit for controlling the detected clock.

In the present invention, the orthogonal detection means obtains the detected output using the detected carriers. The demodulation means obtains the demodulated signals by sampling and demodulating the detected output of the orthogonal detection means using the detected clock. The demodulated symbols of the specific carriers of the demodulated signal are supplied to the constellation analyzing means for obtaining the constellation. If the frequency deviation of the detected carriers or that of the detected clocks is taken place, the phase of the demodulated symbols rotates. Further, as the phase rotating angle is based on the deviation of the detected carrier frequency or the detected clock frequency, the carrier restoring means obtains the carrier synchronization by controlling the restored carriers based on the constellation of the restored symbols. In the phase rotation of the constellation based on the deviation of the detected clock frequency, symbols are reversed or amount of rotation is different between different carriers. The clock detection means obtains the clock synchronization by controlling the detected clocks based on the constellation of more than two demodulated symbols.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention will be described in detail with reference to the FIGS. 3 through 6. Throughout the drawings, like or equivalent reference numerals or letters will be used to designate like or equivalent elements for simplicity of explanation.

Figure 3:
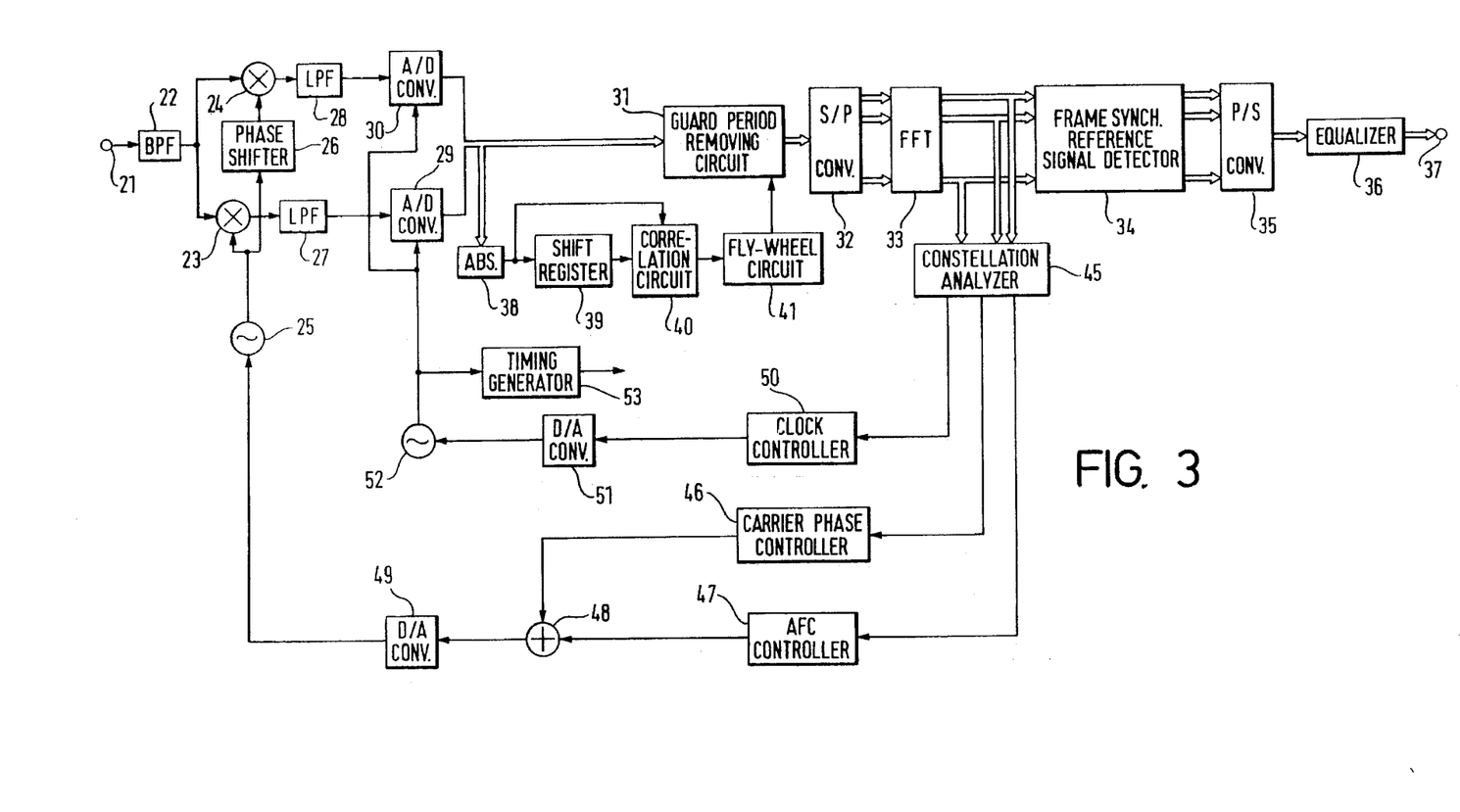
FIG. 3 is a block diagram showing one embodiment of an OFDM sync demodulation circuit according to the present invention.

FIG. 3 is a block diagram showing one embodiment of an OFDM synchronization demodulation circuit according to the present invention. In FIG. 3, the slim line arrow shows the channel of a one-dimensional signal and the wide line arrow shows the channel of a two-dimensional, i.e., complex form signal.

An OFDM modulated wave which has been received by a tuner (not shown) and converted into an intermediate frequency (IF) signal is input to an input terminal 21. The OFDM modulated wave is, for instance, a QAM signal which was OFDM modulated, orthogonally modulated by specific frequency, and transmitted at the transmitter section. The QAM signal is able to express symbols using I-data corresponding to the real part of complex form signals and Q-data corresponding to the imaginary part of the complex form signal. The IF signal is applied to a band pass filter (hereinafter referred to as BPF) 22, which removes noise outside the passing band and outputs the IF signal to multipliers 23, 24.

An oscillator 25 outputs oscillation output (detected carriers) to multiplier 23 and, to multiplier 24 via a phase shifter 28 after its oscillation output frequency is controlled by a control signal from a digital/analog converter (hereinafter referred to as D/A converter) 49 which will be described later. The phase shifter 26 obtains a Q-axis oscillation output by shifting oscillation output (I-axis oscillation output) by 90°. The multipliers 23, 24 perform the orthogonal detection by multiplying the I-axis or Q-axis oscillation output with the IF signal, respectively. The in-phase axis detection output (I-signal) from the multiplier 22 is applied to an analog/digital converter (hereinafter referred to as A/D converter) 29 via a low-pass filter (hereinafter referred to as LPF) 27. The orthogonal axis detection output (Q-signal) from the multiplier 24 is applied to another A/D converter 30 via an LPF 28. LPFs 27, 28 remove harmonic wave components of I-signal or Q-signal, respectively. The A/D converters 29, 30 are supplied with an operating clock from an oscillator 52 which will be described later A/D converters 29, 30, convert signals which are input into discrete values at a sampling interval based on the operating clock, and output them to an absolute value circuit 38 and a guard period removing circuit 31.

The absolute value circuit 38 obtains an absolute value of amplitude of OFDM modulated wave and outputs it to a shift register 39 and a correlator 40. As transmission data is modulated through division into several hundred through several thousand carriers in the OFDM, the modulation symbol rate of each carrier becomes extremely low and a period of one symbol becomes extremely long. Therefore, delay time introduced by reflecting waves has little effect. Furthermore, the effect of multi-path interference can be removed effectively when a guard period is set in front of an available symbol period. The guard period is produced by cyclically copying the terminal section of the available symbol period. If a multi-path interference delay time is provided in the guard period, inter-symbol interference from delayed adjacent symbols may be prevented by demodulating only signals of the available symbol period during the demodulation.

The shift resister 39 outputs the output of the absolute value circuit 38 to the correlator 40 by delaying it for a time over the available symbol period and the guard period. Then, it becomes possible to output the guard period of the delay signal from the shift resister 39 at the timing when the output of the absolute value circuit 39 is in the terminal section of the available symbol period. Since the guard period is a copy of the terminal section of the available symbol period, the correlation between the output of the absolute value circuit 38 and the output of the shift resister 39 becomes extremely high at the timing of the guard period. Further, as OFDM modulated wave is a noisy signal, the correlation between the output of the absolute value circuit 38 and its delay signal is small. The correlator 40 obtains the correlation between two inputs and outputs a timing signal showing that the result of correlation exceeds the specific threshold value to a flywheel circuit 41. The timing signal is generated from the correlator 40 for every OFDM symbol. The flywheel circuit 41 is reset by the timing signal from the correlator 40 and outputs a guard timing signal of a fixed cycle based on the timing signal cycle to the guard period removing circuit 31.

The guard period removing circuit 31 removes the guard period of OFDM modulated waves (I-signal and Q-signal), extracts the available symbol period signal, outputs it to a S/P (serial/parallel) converter 32. The S/P converter 32 converts the input serial data into parallel data and outputs the parallel data to an FFT circuit 33.

The FFT circuit 33 performs the FFT process by regarding inputs of an I-signal and a Q-signal as the real part and the imaginary part of a complex form signal, respectively. The synchronization demodulation of respective carriers is performed by the FFT process. That is, the real part and the imaginary part of the complex form signal output which was FFT processed by the FFT circuit 33 respectively become the I-data and the Q-data which are demodulated symbols of respective carriers. These OFDM demodulated signals are applied to a frame coherent reference signal detector 34. The frame coherent reference signal detector 34 passes and outputs the OFDM demodulated signals to a P/S (parallel/serial) converter 35 and by extracting frame coherent signals and equalized reference signals from the OFDM demodulated signals, outputs them to an equalization circuit 36.

The P/S convertor 35 converts the OFDM demodulated signals which have become QAM signals for respective carriers after being demodulated by the FFT circuit 33 into serial data and outputs to the equalization circuit 36. The equalization circuit 38 equalizes the input data using a reference signal, and outputs output data through an output terminal 37.

Figure 4:
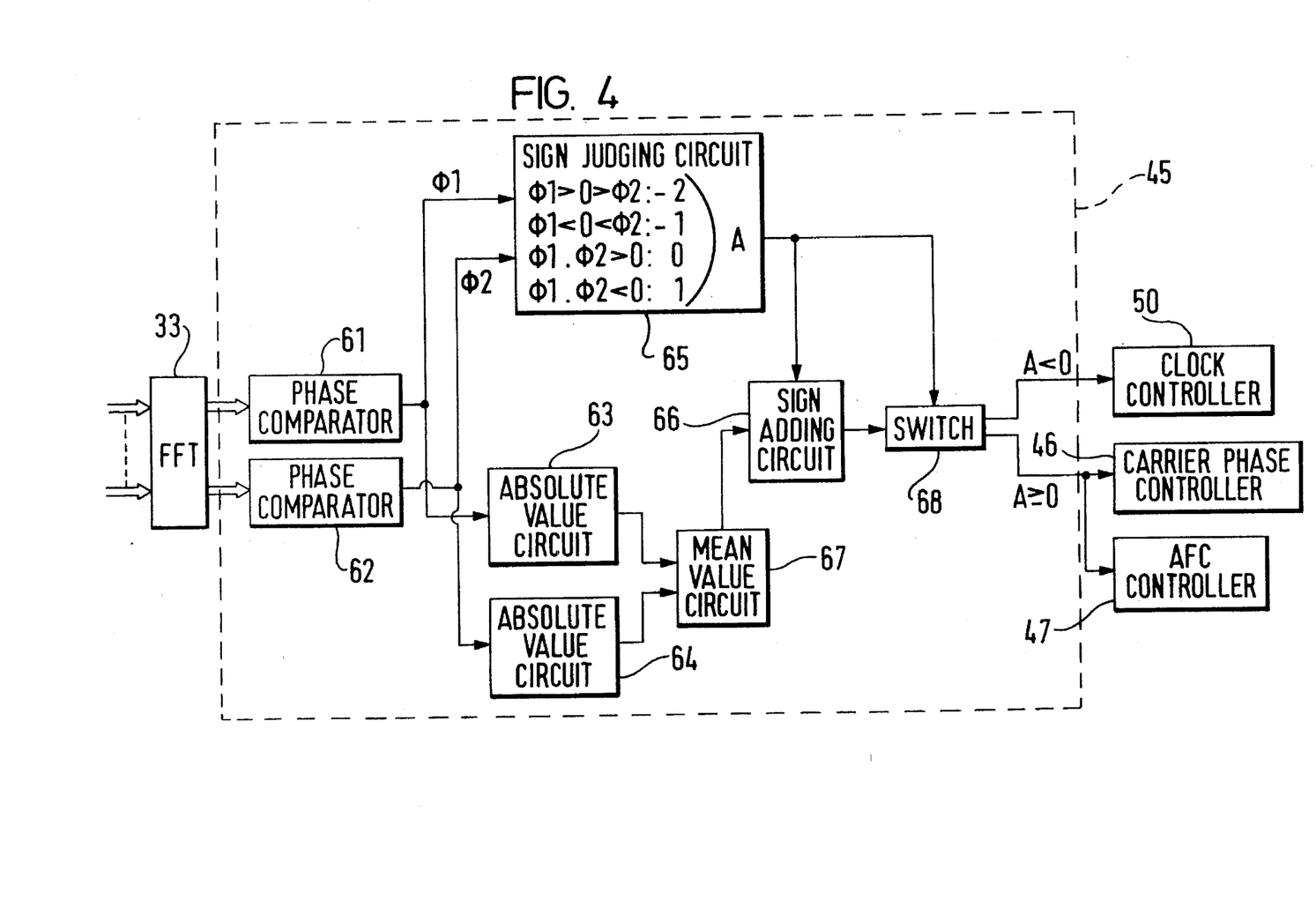
FIG. 4 is a block diagram showing a constellation analyzer shown in FIG. 3.

In this embodiment, the demodulated output of the FFT circuit 33 is also supplied to a constellation analyzer 45 in order to obtain carrier synchronization and clock synchronization. FIG. 4 is a block diagram showing one example of the constellation analyzer in FIG. 3.

Demodulated symbols of specific carriers from the FFT circuit 33 are supplied to the constellation analyzer 45. For instance, to make the explanation simple only demodulated symbols of two carriers of minimum and maximum frequencies are supplied to the constellation analyzer 45 in FIG. 4. These demodulated symbols of two carriers of minimum and maximum frequencies are supplied to phase comparators 61, 62, respectively. The constellation analyzer 45 detects the phase rotation of OFDM demodulated signals by analyzing the constellation of demodulated symbols of specific carriers of the respective OFDM demodulated signals. The phase comparators 61, 62 compare the constellation phases of minimum and maximum frequency carriers with specific reference phases and outputs phase differences ø1, ø2 to absolute value circuits 63, 64. These phase differences ø1 and ø2 are also input to a sign judging circuit 65.

Figure 5:
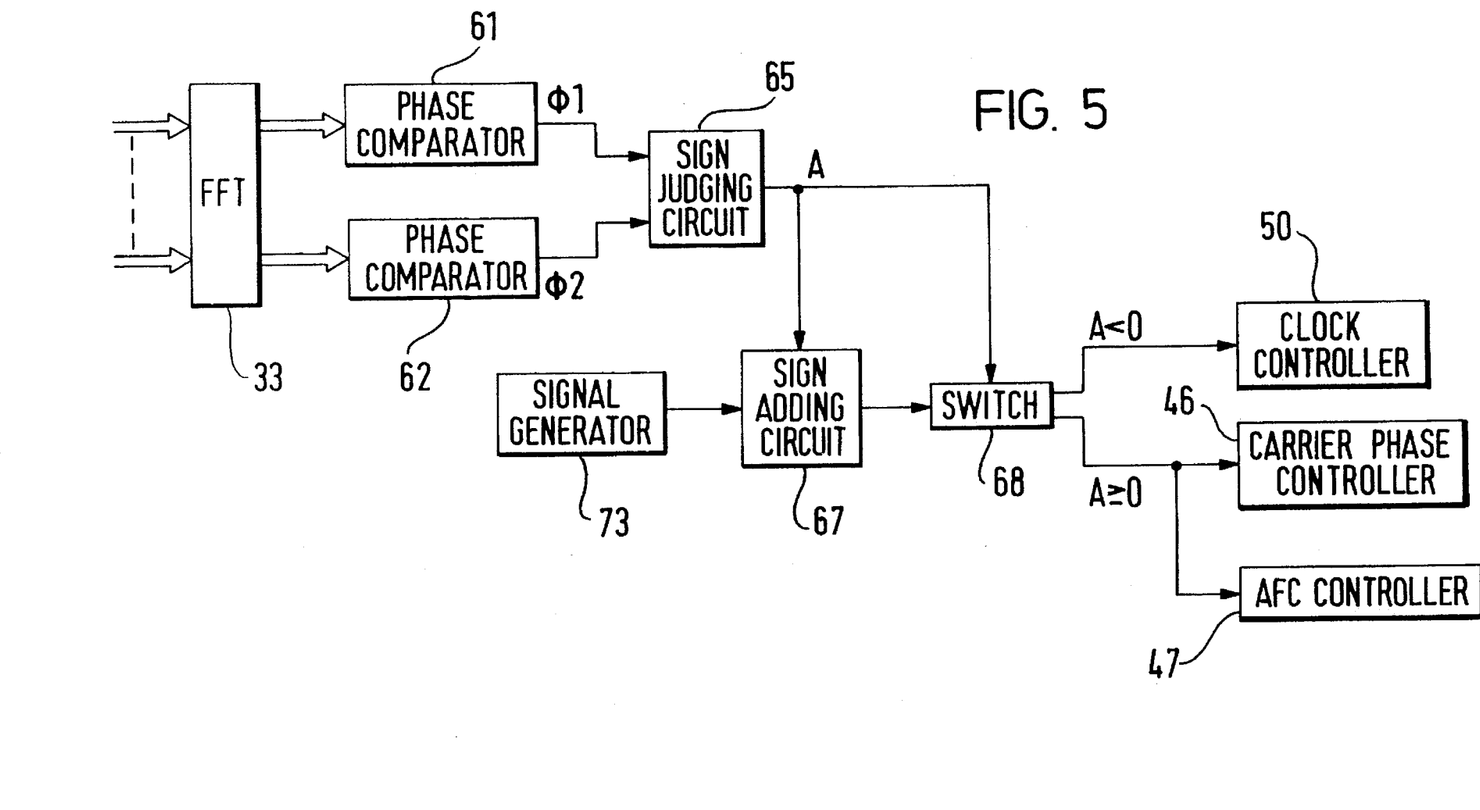
FIG. 5 is a block diagram showing another example of the constellation analyzer.

It is assumed that the restored carrier frequency of the oscillator 25 for orthogonal detection (see FIG. 3) does not coincide with OFDM demodulated wave carrier frequency. In this case, phases of detected outputs of the multipliers 28, 24 rotate. The phase comparators 61, 62 detect the phase rotation. The absolute value circuits 63, 64 obtain absolute values of the input phase differences Φ1 and Φ2 and output them to a mean value circuit 66, which obtains a mean value of two inputs and outputs it to a sign adding circuit 67 as a representative value of a carrier rotation angle. However, the absolute value circuits 63, 64 and the mean value circuit 65 are not always necessary. For instance, an oscillator which outputs "1" as a representative value to express a rotation angle of a carrier may be used. FIG. 5 is a block diagram showing another example of the constellation analyzer where a signal generator 73 is used instead of the absolute value circuits 63, 64 and the mean value circuit 66, as shown in FIG. 4. The signal generator 73 always outputs, for instance, "1" as a representative value of the rotation angle.

If a difference between a detected reference carrier frequency for detection operation and a carrier frequency of received signal is an integer multiple of a frequency difference between carriers of OFDM demodulated waves, the phase of detected output rotates by 360°, and therefore, the outputs of the phase comparators 61, 62 become zero (0). That is, a phase difference between adjacent carriers is 360° and if sampling frequencies of the A/D converters 29, 30 are proper (e.g. they are clock synchronized), the phase rotations of carriers coincide with each other and the outputs of the phase comparators 61, 62 become nearly the same values. For instance, if a phase difference ø1 is a positive value, a phase difference ø2 also becomes a positive value, while if the phase difference ø1 is a negative value, the phase difference ø2 also becomes a negative value.

On the other hand, even when no clock synchronization has been attained and the sampling frequency of OFDM demodulated wave is not proper, the phase of OFDM demodulated signal rotates. In this case, when assuming that restored carrier frequency coincides with carrier frequency of OFDM demodulated wave, the phase difference ø1 of the lower frequency carrier and the phase difference ø2 at the higher frequency carrier are reversed and bounded by the carrier of carrier frequency 0. For instance, when the phase difference ø1 is positive, the phase difference ø2 will become negative and if the phase difference ø1 is negative, the phase difference ø2 will become positive.

The sign judging circuit 65 judges whether the phase rotation of carriers is due to deviation of carrier synchronization or deviation of clock synchronization by judging signs of phase differences ø1 and ø2. That is, if ø1>ø2 or ø1<ø2, the sign judging circuit 65 judges that no clock synchronization has been attained and outputs "−2" or "−1", respective as the judging result A. If ø1, ø2>0 or ø1, ø2<0, the sign judging circuit 65 judges that no carrier synchronization has been attained and outputs "0" or "1", respectively as the judging result A. These judging results A are supplied to the sign adding circuit 67 and a switch 68.

The sign adding circuit 67 decides the direction to control frequency deviation by adding a positive or negative sign to a representative value of the rotating angle from the mean value circuit 66 based on the judging result A. The output of the sign adding circuit 67 is supplied to the switch 68. The switch 68 outputs the output of the sign adding circuit 67 to a clock controller 50 if the judging result A is negative and outputs the output of the sign adding circuit 67 to the carrier phase controller 46 and the AFC controller 47 if the judging result A is positive.

In FIG. 3, the clock controller 50 receives the output of the constellation analyzer 45 and outputs a control signal to make the outputs of the phase comparators 61, 62 zero (0) to a D/A converter 51. The D/A converter 51 converts the input control signal into an analog signal and supplies it to an oscillator 52. The oscillator 52 controls oscillation frequency based on the control signal and generating a clock for OFDM modulated wave sampling, applies it to the A/D converters 29, 30. Thus, it becomes possible to obtain clock synchronization. Further, the clock from the oscillator 52 is also applied to a timing generator 53. The timing generator 53 generates a timing signal in synchronism with the sampling clock for parts in the demodulation circuit.

An AFC controller 47 receives the output of the constellation analyzer 45, generates an AFC control signal to bring restored carrier frequency in coincidence with carrier frequency, and applies the AFC control signal to an adder 48. A carrier phase controller 46 generates a phase coherent control signal to bring the detected carrier phase in coincidence with the carrier phase based on the output of the constellation analyzer 45, and outputs the phase coherent central signal to the adder 48. The adder 48 adds up the AFC control signal and the phase sync control signal and outputs the added result to a D/A converter 49. The D/A converter 49 converts the added result into an analog signal and applies it to the oscillator 25. The oscillator 25 is controlled for oscillation by the output of the D/A converter 49 and outputs detected carriers which coincide with carrier frequency. Thus, the carrier synchronization can be attained.

Figure 6A:
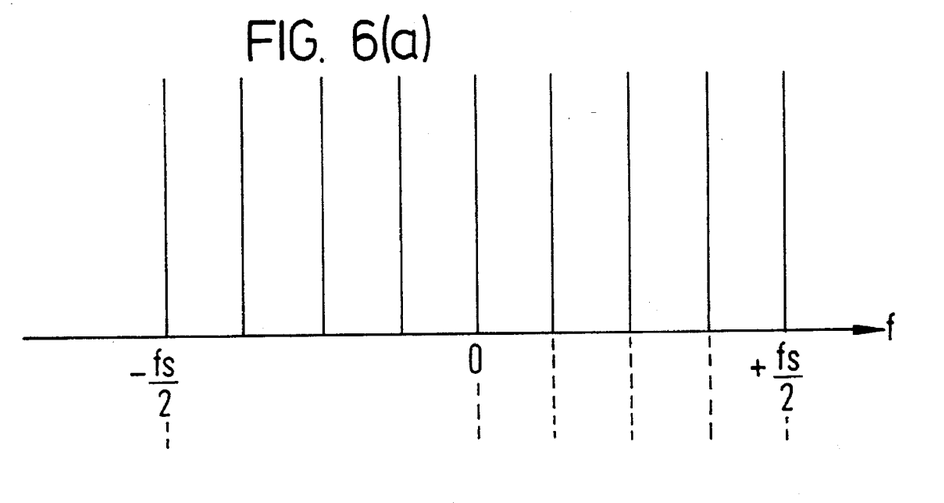
FIGS. 6(a), 6(b) and 6(c) are explanatory diagrams for explaining the operation of the embodiment.
Figure 6B:
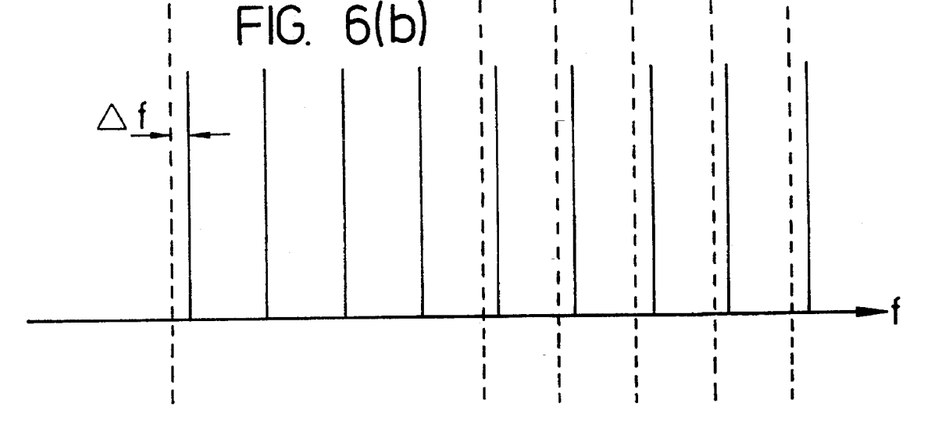
Figure 6C:
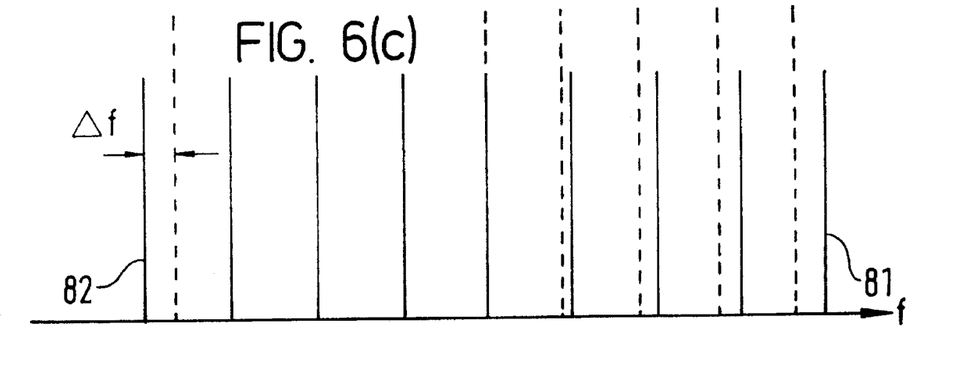

Next, the operation of the embodiment constructed as described above will be explained with reference to the explanatory diagram of FIGS. 6(a) through 6(c). In FIGS. 6(a) through 6(c), frequencies are indicated on the X-axis and amplitudes of carriers from the FFT circuit 33 are indicated on the Y-axis. The output of the FFT circuit will be obtained as described below.

OFDM modulated waves transmitted via a transmission line (not shown in FIG. 3) are received by a tuner (not shown), converted into an intermediate frequency signal and supplied to the BPF 22 via the input terminal 21. The BPF 22 outputs the base-band signal multipliers 23, 24 after removing noise contained in the signal. After receiving in-phase axis restored carriers and orthogonal axis detected carriers, respectively, multipliers 23, 24 perform the orthogonal demodulation of the signals. An in-phase axis signal from the multiplier 23 is applied to the A/D converter 29 via the LPF 27, and an orthogonal axis signal from the multiplier 24 is applied to the A/D converter 30 via the LPF 28. The A/D converters 29, 30 convert the in-phase axis signal and the orthogonal axis signal into digital signals using the restored clock and output the digital signals to the guard period removing circuit 31.

On the other hand, OFDM modulated waves from the A/D converters 29, 30 are supplied to the absolute value circuit 38 from which absolute values of the OFDM modulated waves are supplied to the shift resister 39 and the correlator 40. The shift resister 39 applies the OFDM modulated waves to the correlator 40 by delaying for the available symbol period. As a result, the relation between the OFDM modulated waves and its delay signals become high and the output signal level of the correlator 40 becomes high at the timing of the terminal section of the available symbol period. The flywheel circuit 41 generates a guard timing signal for every OFDM modulating wave by comparing the output level of the correlator 40 with a specific threshold value, and outputs the guard timing signal to the guard period removing circuit 31. The guard period removing circuit 31 removes a guard period from the OFDM modulated waves using the guard timing signal.

The resulting OFDM modulated waves which have the guard period thus removed and only the available symbol period extracted, are supplied to the S/P convertor 32 where they are converted into parallel data. The FFT circuit 33 performs an FFT process on the parallel conversion of the OFDM modulated waves. As a result, the OFDM modulated signal from the FFT circuit 33 is supplied to the frame coherent/reference signal detector 34, where the frame coherent signal and the reference signal for waveform equalization are simultaneously extracted. The OFDM modulated signal is converted into serial data by the P/S converter 35, and its waveforms are equalized in the equalization circuit 38 and output through the output terminal 37.

In this embodiment, the OFDM demodulated signal from the FTT circuit is used to obtain the clock synchronization and the carrier synchronization. The OFDM demodulated signal from the FFT circuit 33 is supplied to the constellation analyzer 45. It is assumed for the following description that minimum and maximum frequency carriers out of the OFDM modulated wave carriers, as shown in FIG. 6(a), are supplied to the constellation analyzer 45. Further, as shown in FIG. 6(a), frequencies of these maximum and minimum frequency carriers are fs/2 and −fs/2, respectively. The phase comparators 61, 62 of the constellation analyzer 45 compare the phases of maximum and minimum frequency carriers with the specific reference phases.

Now, it is assumed that the OFDM modulated wave carrier frequency and the detected carrier frequency of the oscillator 25 do not coincide with each other. Then, the phase of orthogonally demodulated OFDM modulated wave rotates, and carriers of the OFDM demodulated signal from the FFT circuit are shifted from the normal carrier frequency indicated by the broken line on the frequency axis, as shown by FIG. 6(b). That is, all carriers of the OFDM demodulated signal are shifted from the normal position on the frequency axis by Δf. The amount of shift Δf is a frequency difference between the OFDM modulated wave carrier and detected carrier.

When the constellation of the OFDM demodulated symbols is analyzed under the state, it is seen that carriers rotate at a phase angle corresponding to the amount of shift Δf. That is, if carriers haven't been synchronized, all carriers rotate at the same phase angle. Accordingly, the outputs of the phase comparators ø1, ø2 become the same polarity. The sign judging circuit 65 outputs "0" as the judging result A when judged that the phase differences ø1, ø2 are at positive polarity and "1" when judged that they are at negative polarity. On the other hand, after the phase differences ø1, ø2 are supplied to the absolute value circuit 63, 64 for obtaining absolute values, a mean value of them is obtained by the mean value circuit 66. The mean value is supplied to the sign adding circuit 67 as a representative value of carrier phase angle. The sign adding circuit 67 adds a sign showing the adjusting direction of detected carrier frequency to the representative value of phase angle based on the judging result A and outputs the added result to the switch 68. In this case, the switch 68 outputs the output of the sign adding circuit 67 to the carrier phase controller 48 and the AFC controller 47.

The carrier phase controller 48 and the AFC controller 47 generate the phase sync control signal and the AFC control signal, respectively, based on the output of the constellation analyzer 45. These signals are added up in the adder 48, converted into an analog signal by the D/A converter 49 and supplied to the oscillator 25. Thus, the oscillation output of the oscillator 25 is controlled so that the restored carrier frequency coincides with the carrier frequency of the OFDM modulated wave.

Here, it is assumed that no clock synchronization has been attained and sampling frequency of the A/D converter is lower than proper frequency. Then, the carrier phase of OFDM demodulated signal rotates. Now, it is assumed that carrier synchronization has been attained and the phase of frequency 0 carrier of the OFDM demodulated signal does not rotate and the frequency is proper. In this case, carriers other than those of frequency 0 out of the OFDM demodulated signal are generated while shifted from proper carrier frequency, as shown in FIG. 6(c). That is, while shift of frequency 0 carriers is Δf=0, carriers at the higher frequency is shifted from normal frequency and amount of shift Δf becomes large as frequency becomes high. On the other hand, carriers at the lower frequency are shifted to the negative direction rather than to the normal frequency, and in this case, the amount of shift Δf also becomes large as frequency becomes low.

That is, if the frequency of the restored clock is shifted, the shifting direction of the carrier frequency becoming different at the higher frequency and the lower frequency bounded by the frequency 0 carrier. Therefore, the constellations of demodulated symbols of minimum and maximum frequency carriers are observed in the reverse directions, respectively. For instance, assuming that the maximum frequency carriers 81, as shown in FIG. 6(c), is rotating clockwise, the minimum frequency carriers 82 rotate counterclockwise. That is, the phase rotating directions of the higher frequency carriers and the lower frequency carriers differ from that of frequency 0 carriers.

If the phase differences Φ1, Φ2 are different signs, the sign judging circuit 65 judges that detected clock frequency has been shifted. That is, the sign judging circuit 65 outputs "−2" as the judging result A if ø1>0>ø2 and "−1" as the judging result A if ø1<0<ø2. The sign adding circuit 67 adds a sign showing the adjusting direction of detected clock frequency to a representative value of phase angle based on the judging result A and outputs the added result to the switch 68. Then, the switch 68 outputs the output of the sign adding circuit 67 to the clock controller 50.

If two higher frequency carriers or two lower frequency carriers than frequency 0 carrier are used as carriers to be supplied to the constellation analyzer 45, phase differences ø1, ø2 will become the same sign. However, as their values are different each other, the shift of detected clock frequency can be detected.

The clock controller 50 generates a control signal for controlling restored clock frequency based on the output of the constellation analyzer 45. The control signal is converted into an analog signal by the D/A converter 51 and is supplied to the oscillator 52. Thus, the oscillation output of the oscillator 52 is controlled and detected clock frequency conforms to proper sampling frequency of the OFDM modulated wave. The clock synchronization is thus attained.

Further, the amount of shift by the carrier synchronization is sufficiently larger than the amount of shift by the clock synchronization therefore, even when both of the carrier synchronization and the clock synchronization have not been attained, both the carrier and the clock synchronizations can be attained by first obtaining the carrier synchronizing carrier and then, the clock synchronization based on the phase differences ø1, ø2 of the phase comparators 61, 62.

As described above, in this embodiment the phase rotation of demodulated symbols from the FFT circuit 33 is obtained by the constellation analysis and by detecting the carrier synchronization shift and the clock synchronization shift, detected carriers and clocks are controlled based on the detected result. Thus, the carrier and clock synchronizations are attained based on information signals only, rendering it possible to attain the carrier and clock synchronizations firmly at high speed without using an expensive oscillator and without inserting a special reference signal and to achieve OFDM demodulation which is strong against disturbance.

As described above, the present invention has an effect to achieve carrier and clock synchronizations using OFDM modulated wave.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. An orthogonal frequency division multiplexing (OFDM) synchronization demodulation circuit comprising:

receiving means for receiving an OFDM modulation signal;

orthogonal detection means for orthogonally detecting the OFDM modulation signal from the receiving means using a restored carrier;

demodulation means for orthogonally demodulating the detected OFDM modulation signal detected by the orthogonal detection means through a sampling of the OFDM detection signal using a restored clock;

phase comparator means for comparing said demodulated detected OFDM modulation signal with specific reference phase signals to produce phase difference signals of demodulated symbols of predetermined carriers in the demodulated OFDM signal;

carrier frequency deviation detection means for detecting a frequency deviation of the restored carrier based on a rotation of the demodulated symbols determined from phase difference signals produced by said phase comparator means;

carrier restoration means responsive to the frequency deviation detected by the carrier frequency deviation detection means for controlling the restored carrier;

clock frequency deviation detection means for detecting a frequency deviation of the restored clock based on rotations of at least two demodulated symbols with different carrier frequencies detected from a single OFDM power spectrum, said rotations being determined from phase difference signals produced by said phase comparator means; and clock restoration means responsive to the frequency deviation detected by the clock frequency deviation detection means for controlling the restored clock.

2. An OFDM synchronization demodulation circuit as claimed in claim 1, wherein the carrier restoration means detects the frequency deviation of the restored carriers when the constellations of more than one demodulated symbol are rotated in the same direction, and the clock restoration means detects the frequency deviation of the restored clock when the constellations of more than one demodulated symbol are rotated in opposite directions or when there is a difference between the rotations.

3. A method for demodulating an orthogonal frequency division multiplexing (OFDM) synchronization, comprising the steps of:

receiving an OPDM modulation signal;

orthogonally detecting the received OFDM modulation signal using a restored carrier;

orthogonally demodulating the detected OFDM modulation signal through a sampling of the OFDM detection signal using a restored clock;

comparing said demodulated detected OFDM modulation signal with specific reference phase signals to produce phase difference signals of demodulated symbols of predetermined carriers in the demodulated OFDM signal;

detecting a frequency deviation of the restored carrier based on a rotation of the demodulated symbols with different carrier frequencies detected from a single OFDM power spectrum;

controlling the restored carrier in response to the detected frequency deviation;

detecting a frequency deviation of the restored clock based on rotations of at least two demodulated symbols with different carrier frequencies detected from a single OFDM power spectrum, said rotations being determined from phase difference signals produced in said step of comparing; and controlling the restored clock in response to the detected frequency deviation.

4. A method as claimed in claim 3, wherein the frequency deviation of the restored carriers is detected when the constellations of more than one demodulated symbol are rotated in the same direction, and the frequency deviation of the restored clock is detected when the constellations of more than one demodulated symbol are rotated in opposite directions or when there is a difference between the rotations.

* * * * *